(12) United States Patent
Conner et al.

(10) Patent No.: US 7,124,650 B2
(45) Date of Patent: Oct. 24, 2006

(54) METHOD AND SYSTEM FOR DETERMINING AUTOMOTIVE CONVERTIBLE TOP OPERATING CHARACTERISTICS

(75) Inventors: Gregory Alan Conner, Ann Arbor, MI (US); Gregory J. Grudzinski, Perrysburg, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/708,990

(22) Filed: Apr. 6, 2004

(65) Prior Publication Data
US 2005/0217390 A1 Oct. 6, 2005

(51) Int. Cl.
*G01L 1/26* (2006.01)
(52) U.S. Cl. .................................. 73/862.393
(58) Field of Classification Search ........... 73/862.381, 73/862.391, 862.44, 862.453, 862.454, 862.393; 296/107.01, 107.09, 107.11, 225
See application file for complete search history.

(56) References Cited
U.S. PATENT DOCUMENTS

| | | | | |
|---|---|---|---|---|
| 4,749,193 A | * | 6/1988 | Hacker | ............... 296/107.01 |
| 5,755,467 A | * | 5/1998 | Dilluvio et al. | ............... 292/32 |
| 6,273,492 B1 | * | 8/2001 | Schroder et al. | ....... 296/107.01 |
| 6,299,233 B1 | * | 10/2001 | Mentink | ............... 296/107.09 |
| 6,443,517 B1 | | 9/2002 | Just et al. | |
| 6,454,344 B1 | * | 9/2002 | Okada et al. | ............... 296/121 |
| 6,456,027 B1 | * | 9/2002 | Pruessel | ............... 318/445 |
| 6,539,271 B1 | | 3/2003 | Lech et al. | |
| 2002/0026257 A1 | | 2/2002 | Newmark | |
| 2002/0082736 A1 | | 6/2002 | Lech et al. | |

\* cited by examiner

*Primary Examiner*—Max Noori
(74) *Attorney, Agent, or Firm*—Gigette M. Bejin; Artz & Artz, P.C.

(57) ABSTRACT

A system for measuring an automotive convertible top operating parameter, such as the amount of force required to operate the convertible top, includes a pulldown actuator for moving a convertible top from an open position into a closed position. The pulldown actuator is equipped with position and force transducers. A controller which operates the pulldown actuator records the operational position of the top, as well as the force required to close the top.

14 Claims, 6 Drawing Sheets

METHOD AND SYSTEM FOR DETERMINING AUTOMOTIVE CONVERTIBLE TOP OPERATING CHARACTERISTICS

BACKGROUND OF INVENTION

1. Field of the Invention

The present invention relates to a method and system for determining the amount of pulldown force and/or other operational characteristics needed to move a convertible top in either or both of its opening and closing directions.

2. Disclosure Information

Articulated convertible tops which fold into a cavity located behind the passenger compartment of an automotive vehicle typically employ a complicated linkage mechanism for allowing the top to properly articulate and fold across the sometimes considerable longitudinal expanse of a vehicle's cockpit. Such tops use a large number of movable components which are joined with an equally large number of articulating joints; such joints are characterized by frictional characteristics, which, unfortunately, often vary quite extensively from one top to the next. This means that manufacturers of vehicles employing such convertible tops are often faced with an unhappy situation with manually operated tops because customers may complain that an individual top's operability is not satisfactory because too much force is required to move the top to, for example, its fully closed position. If, on the other hand, the manufacturer uses a power-driven top, variability in the operational force requirement of the top may require the vehicle manufacturer to install a much more powerful drive mechanism than would otherwise be the case were the variability in the force to be accounted for and controlled during the manufacturing process for the convertible top. Yet another problem could arise were the manufacturer to install a drive mechanism having a motor with insufficient capacity for a substantial percentage of the tops, because such motors would likely suffer truncated useful lives.

A method and system according to the present invention allows manufacturers of convertible tops, and ultimately, manufacturers of convertible top vehicles, to accurately assess the operational force requirements for tops installed on a series of vehicles, both during and after the manufacturing process has been completed. Armed with the data for each individual top, as well as trend analyses of the data, the manufacturers of the top and vehicle will be able to make necessary adjustments required to keep the operating effort or force within acceptable limits for manual as well as power operation, or even with tops combining manual and power operation.

SUMMARY OF INVENTION

A system for measuring the operational characteristics of a convertible top for an automotive vehicle includes a pulldown actuator, operated by a controller, for moving a top from an open position into a closed position, and a position transducer, operatively associated with the pulldown actuator, for measuring the travel of the convertible top. A force transducer, also operatively associated with the pulldown actuator, measures the force exerted by the pulldown actuator upon the top. Finally, the controller records the measured travel of the top as well as the force exerted by the pulldown actuator at each one of multiple points during the travel of the top. The present system may further include a gripper for grasping a manual handhold formed in the convertible top, with the gripper being attached to the pulldown actuator. The system may also include a gripper for grasping a machine attachment point when the convertible top is intended to be power operated.

A system according to the present invention further includes a fixture upon which the pulldown actuator and a top may be mounted so as to allow the top to be cycled for the purpose of measuring the travel of the top and the force or other operational characteristics associated with movement of the top from an open position to a closed position.

According to another aspect of the present invention, a method and system for measuring an automotive convertible top includes a removable anchor structure for mounting a pulldown actuator within an automobile for the purpose of measuring the travel and closing force of a convertible top installed upon the vehicle.

According to another aspect of the present invention, a method for determining the force required to close a convertible top includes the steps of attaching a pulldown actuator to a portion of the top corresponding to a manual gripping location, and moving the top from an open position to a closed position by means of the pulldown actuator while measuring the travel of the top and the corresponding force exerted by the pulldown actuator upon the top as the top is moved to the closed position. The present method further includes the step of recording the measured values of top travel and force and also may include the steps of performing a statistical analysis upon the recorded values of top travel and force.

It is an advantage of the present method and system that automotive convertible top operating efforts may be accurately measured, and the results of the measured efforts for several tops trend analyzed so as to allow the design and production of vehicles with more consistent top operating efforts. The importance of this capability is underscored by the fact that variability in top operating effort may be exacerbated by such variables as the type of material, for example cloth or vinyl, which is used in the top, and by the tension of the material covering the top.

It is a further advantage of the present invention that the present method and system allows a top motor drive system to be accurately specified because the top operating efforts may be kept in a smaller operational window.

It is yet another advantage of one aspect of the present invention that the present pulldown actuator and control system may be used with vehicles in the field so as to assess customer concerns with top operating efforts.

It is yet another advantage of the present invention that the pulldown actuator and control system produce statistically stable results. This produces the further advantage that convertible top closing forces and other operating parameters may be accurately tracked throughout extended production runs, as well as through lengthy useful life testing.

It is yet another advantage of the present invention that the present pulldown actuator and control system may be used to control the convertible top build process, so as to produce vehicles without excessive wind noise, or air or water leaks, and with superior appearance and convertible top fit characteristics.

Other advantages, as well as objects and features of the present invention, will become apparent to the reader of this specification.

DETAILED DESCRIPTION

Figure 1:
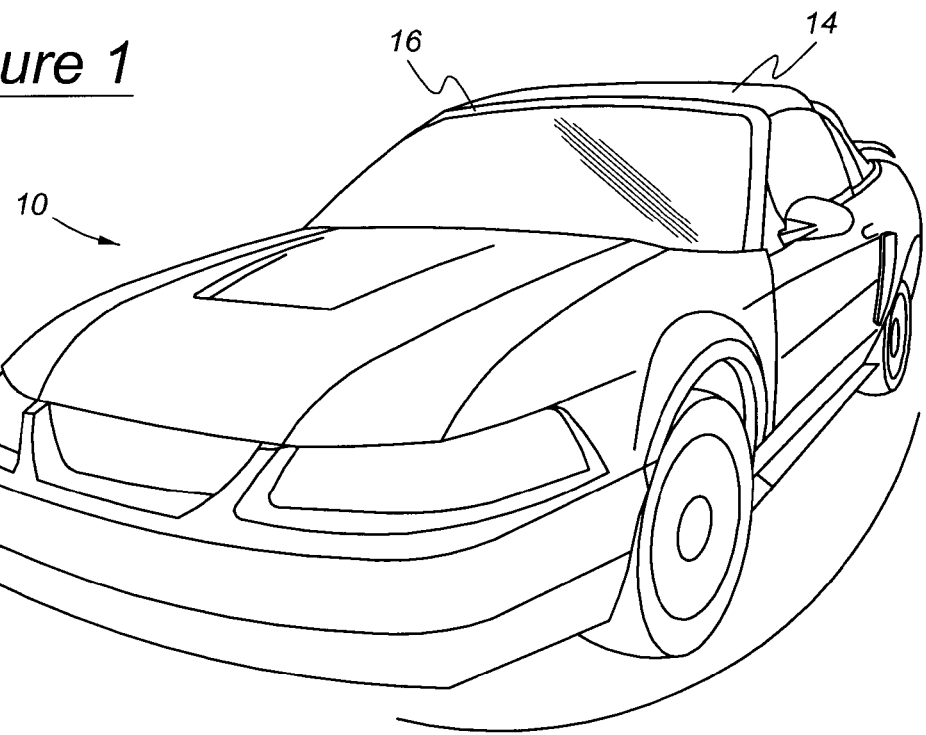
FIG. 1 is a perspective view of a vehicle having a convertible top according to the present invention.
Figure 2:
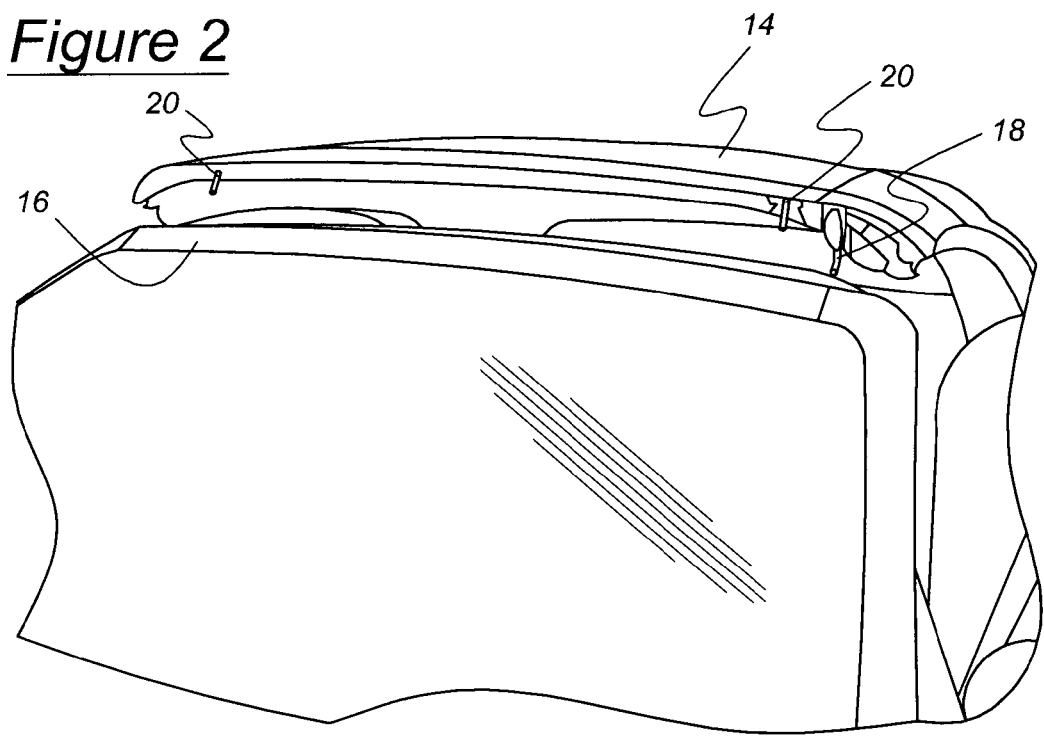
FIG. 2 is a partial frontal view of the vehicle shown in FIG. 1.

As shown in FIG. 1, vehicle 10 has top 14 which closes to windshield header 16. FIG. 2 shows top 14 in a position in which guide pins 20 are approaching windshield header 16, where one or more hooks 18, which are part of the latch mechanism, will maintain top 14 in contact with windshield header 16. With the type of convertible top shown in several of the Figures in this specification, a motor driving either a hydraulic pump or some other type of mechanism (not shown) drives the top to the position shown in FIG. 2. Then the vehicle's driver must manually complete the movement of the top to the latched position and close the latches.

Those skilled in the art will appreciate in view of this disclosure that the present system and method could be employed with convertible tops having entirely manual or automatic operation, including the latching function. Moreover, those skilled in the art will further appreciate in view of this disclosure that the present system and method could be employed to measure or otherwise determine convertible top operational characteristics other than operating effort or force. For example, such characteristics as operational noise, operational speed, operation at lower or higher ambient temperatures, or operation with various types of top fabrics, or more rigid panels, or various types of linkage mechanisms or linkage joints, could all be assessed in accord with good engineering practice through the use of the present system and method. Moreover, the present system and method could be employed to assess not only top closing force, but also top operating force or other characteristics at any point during the top's opening and closing cycles.

Figure 3:
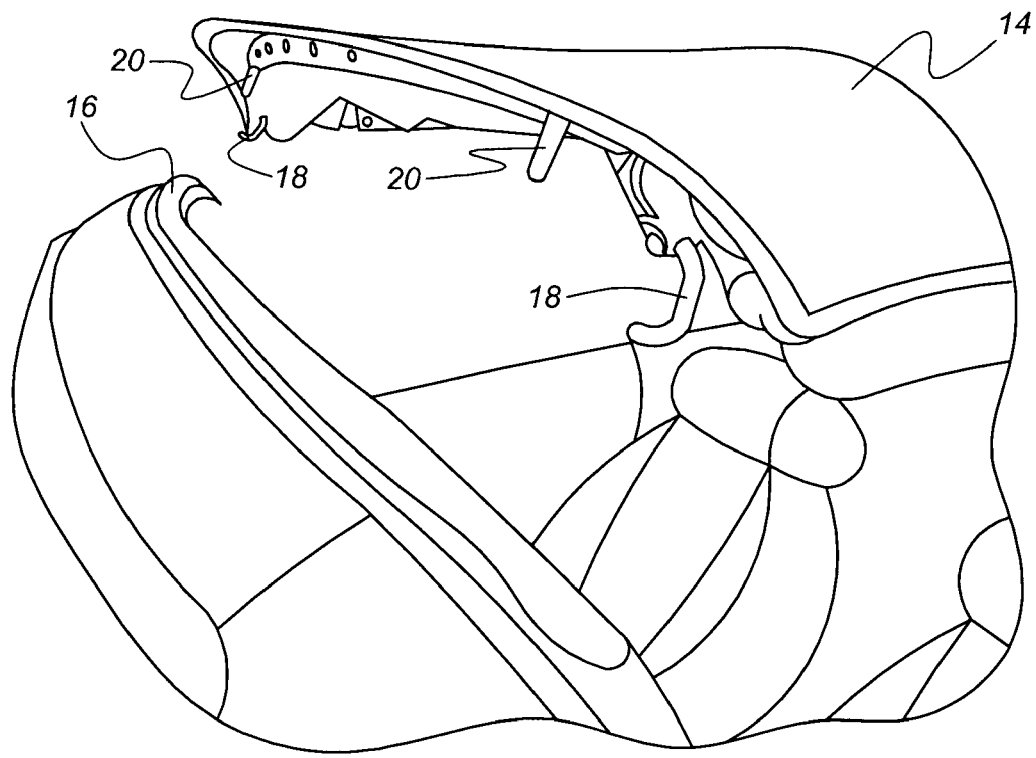
FIG. 3 is a perspective view of a portion of the vehicle in FIG. 1 showing a top in an open position.

FIG. 3 illustrates top 14 in an open position, with guide pins 20 of top 14 approaching windshield header 16. Point A of FIG. 12, which is a force and travel distance diagram, represents the travel distance at which force tending to resist movement of top 14 is first sensed. Pins 20 are the first portion of top 14 to contact windshield header 16 and the effect of this contact is shown at point C of FIG. 12. Thus, as pins 20 contact windshield header 16 at the locations of mating sockets (not shown) the force required to move top 14 rises from the level at point A and through point B to point C and moves up through the level at point D to the level at point E, where pins 20 are fully driven. Thus, point E represents the operational force when top 14 is fully seated upon windshield header 16. And, point F indicates an "over-closed" condition marked by very high engagement force.

Figure 12:
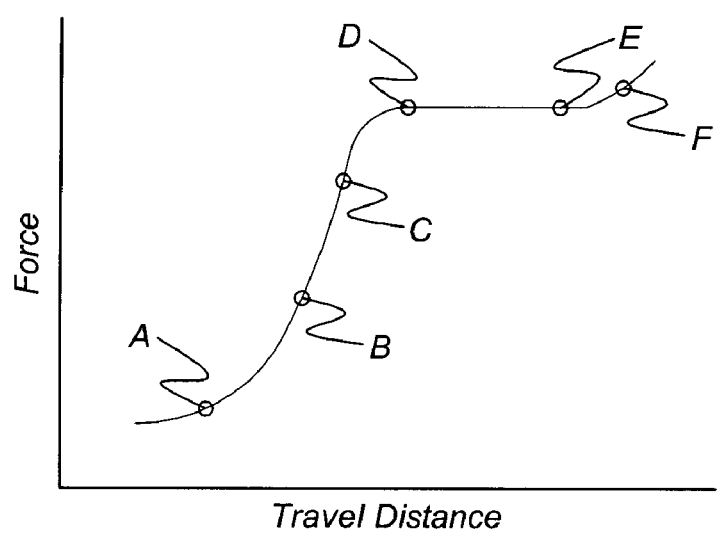
FIG. 12 illustrates a plot of force versus travel distance for a typical convertible top or family of otherwise identical convertible tops.

A problem faced by convertible top manufacturers frequently resides in the fact that the data exemplified by FIG. 12 for a family of vehicles cannot be reduced to a single curve because too much variability exists between individual tops and/or vehicles. Thus a whole family of curves will need to be plotted. Studies have shown that top closing efforts vary quite widely from single digit force numbers (in terms of pounds) to 50 or 60 pounds or more for nominally identical tops. By using the present method and system as a "distant (and distinct) early warning" system of excessive variability in operating effort, corrective action may be taken to keep the variability within acceptable limits. Of course, any and all data points could be individually analyzed, as required by any statistical process control system.

Figure 4:
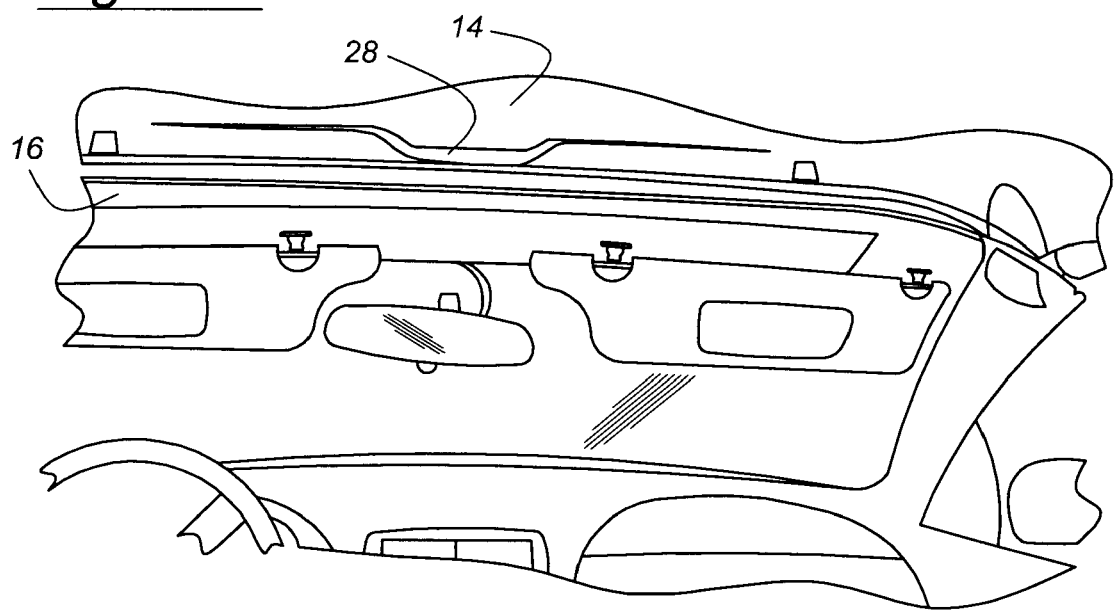
FIG. 4 is a view from the inside of the vehicle of FIG. 1 showing a top which has moved close to its fully closed position.

FIG. 4 shows interior view of vehicle 10 and top 14, and particularly, handhold 28, which is intended to be gripped by the driver of a vehicle when the top is moved to the closed position. This handle 28 is, with the present method and system, gripped by gripper 38 which is attached to pulldown actuator 32 (FIGS. 5 and 6).

Figure 5:
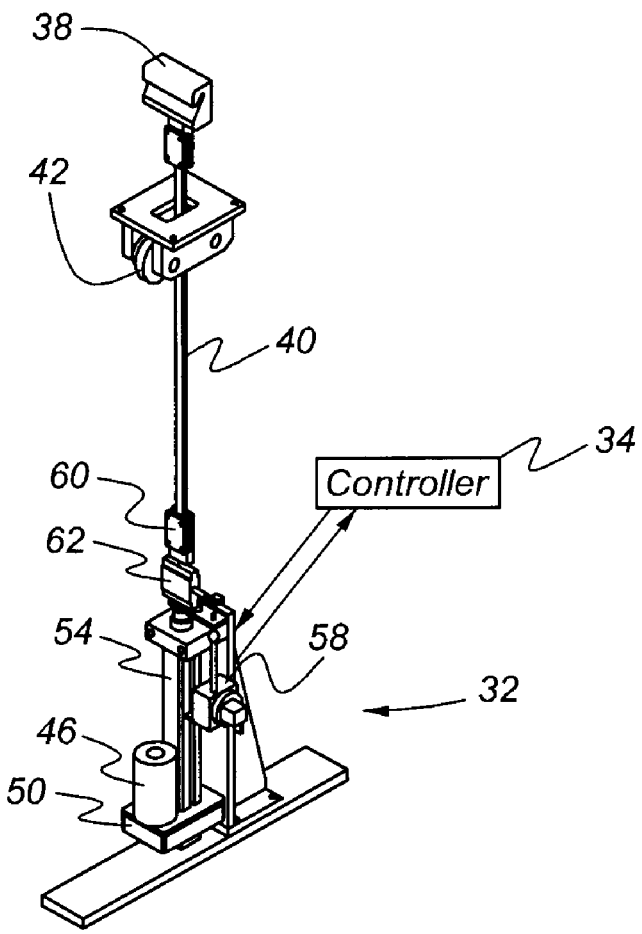
FIG. 5 illustrates a pulldown actuator according to one aspect of the present invention.
Figure 6:
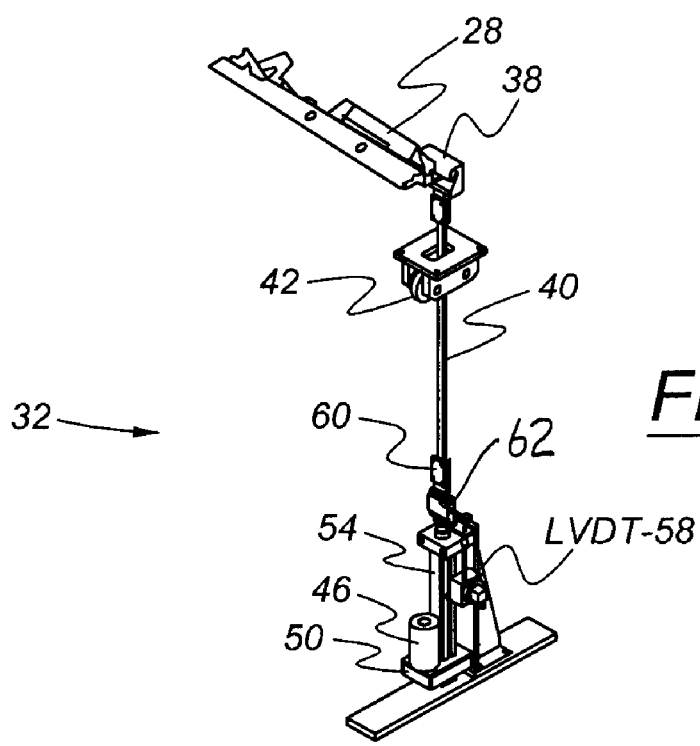
FIG. 6 is similar to FIG. 5, but additionally shows a gripper engaged with portion of a convertible top according to the present invention.

Pulldown actuator 32 is shown in detail in FIGS. 5 and 6. FIG. 6 shows the attachment of gripper 38 to manual handhold 28. Gripper 38 is attached to a flexible, extensible member, 40, which in a preferred embodiment comprises a high tensile strength fiber-reinforced flexible belt typical of those used to power the front end accessory drives of automotive vehicle engines. Flexible inextensible member 40 runs through pulley 42 and is attached to the upper end 60 of hydraulic cylinder 54. Motor 46, which drives pump 50, provides hydraulic oil under pressure to cylinder 54, so as to cause pulldown actuator 32 to move from an extended to a contracted position corresponding to the closed position of convertible top 14. Controller 34 operates motor 46 so as to provide the required stroke of hydraulic cylinder 54 to accomplish closing of the top. Those skilled in the art will appreciate in view of this disclosure that in preferred embodiments, pulldown actuator 32 could employ any type of commonly used linear actuator such as a motor driven screw actuator, or a pneumatic actuator, or yet other types of linear actuators driven by hydraulic, electric, or pneumatic motors.

As convertible top 14 is moved from an open position to a closed position, with the closed position corresponding to position of the top shown in FIG. 1 and an open position corresponding to the positions shown in FIGS. 2, 3 and 4, force transducer 62, which may comprise either a load cell, or any other type of commonly used force transducer known to those skilled in the art and suggested by this disclosure, measures the amount of force being exerted by hydraulic cylinder 54, while at the same time position transducer 58, which may comprise an LVDT, a laser transducer, or other type of position transducer known to those skilled in the art and suggested by this disclosure, provides a record of the corresponding positions by providing a signal to controller 34. Thus, controller 34 not only controls operation of cylinder 54, but also receives, records, and processes signals from position transducer 58 and force transducer 62 according to known data acquisition and processing techniques which are beyond the scope of the present invention.

Following the recording of the force versus position traces for a number of tops, controller 34, or another data collection and analysis system, may be employed to do a statistical analysis ranging from not only simple statistics, but also more elaborate analyses of types generally known to statisticians and engineers and suggested by this disclosure.

Figure 7:
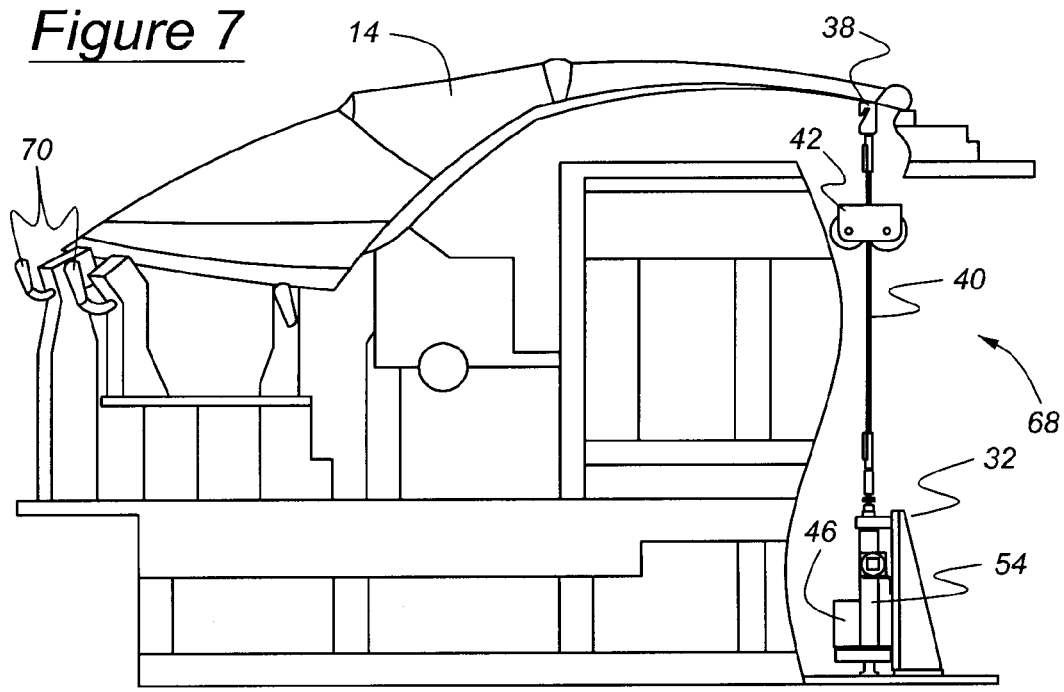
FIG. 7 is a side view of a convertible top attached to a test fixture according to an aspect of the present invention.
Figure 8:
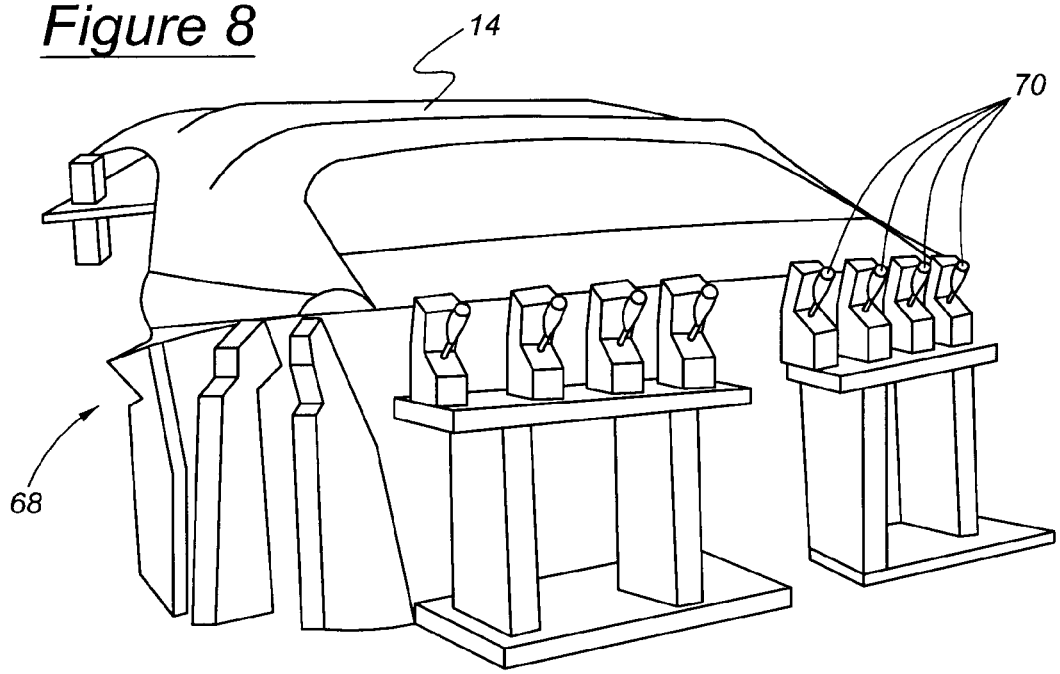
FIG. 8 shows a rear view of the fixture and convertible top of FIG. 7.

FIG. 7 shows a test fixture according to the present invention in which pulldown actuator 32 is mounted within fixture 68. As shown in FIGS. 7 and 8, fixture 68 includes a plurality of clamps 70 for clamping and holding convertible top 14 in a simulation of the mounting of the top to an actual automotive vehicle such as vehicle 10 of FIG. 1. The employment of fixture 68 allows tops to be tested in process by means of the present method and apparatus without the necessity of having the top installed on a vehicle. Thus, if trend analysis of the results of the testing according to the present invention indicates that the operating forces or other operating parameters of the top are either excessive, or too scattered, or both, adjustments may be made in the top build process or top operating mechanisms without the necessity of removing tops that have otherwise been installed upon vehicles.

Figure 9:
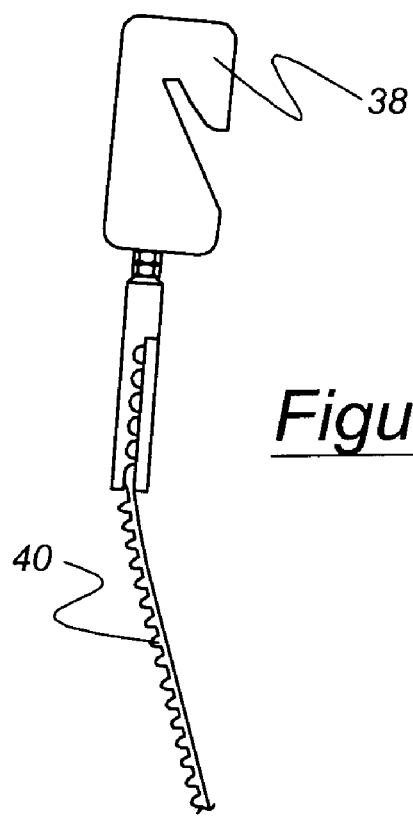
FIG. 9 illustrates a gripper and an inextensible member incorporated in a pulldown actuator according to one aspect of the present invention.
Figure 10:
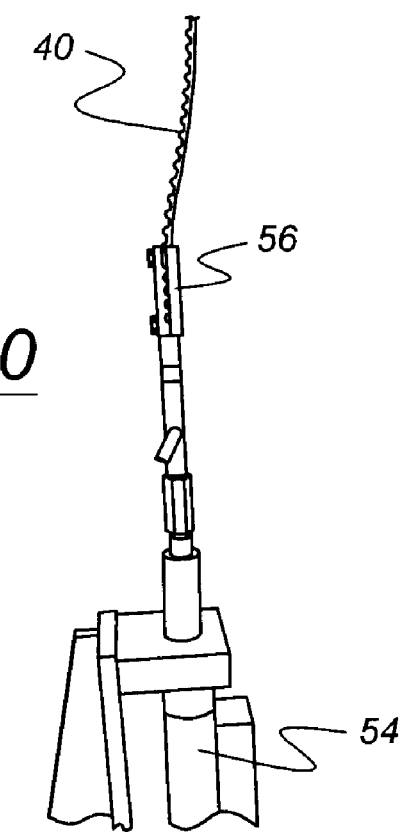
FIG. 10 shows a lower portion of the gripper and inextensible member included in FIG. 9.

FIGS. 9 and 10 illustrate gripper 38 which is attached to flexible inextensible member 40, with the flexible inextensible member being connected to end 56 of cylinder 54. Gripper 38 may be used to functionally couple pulldown actuator 32 to not only handhold 28 for a manually operable convertible top, but may also be used to couple the pulldown actuator to a power latched top by simply using a bracket which is beyond the scope of this invention.

Figure 11:
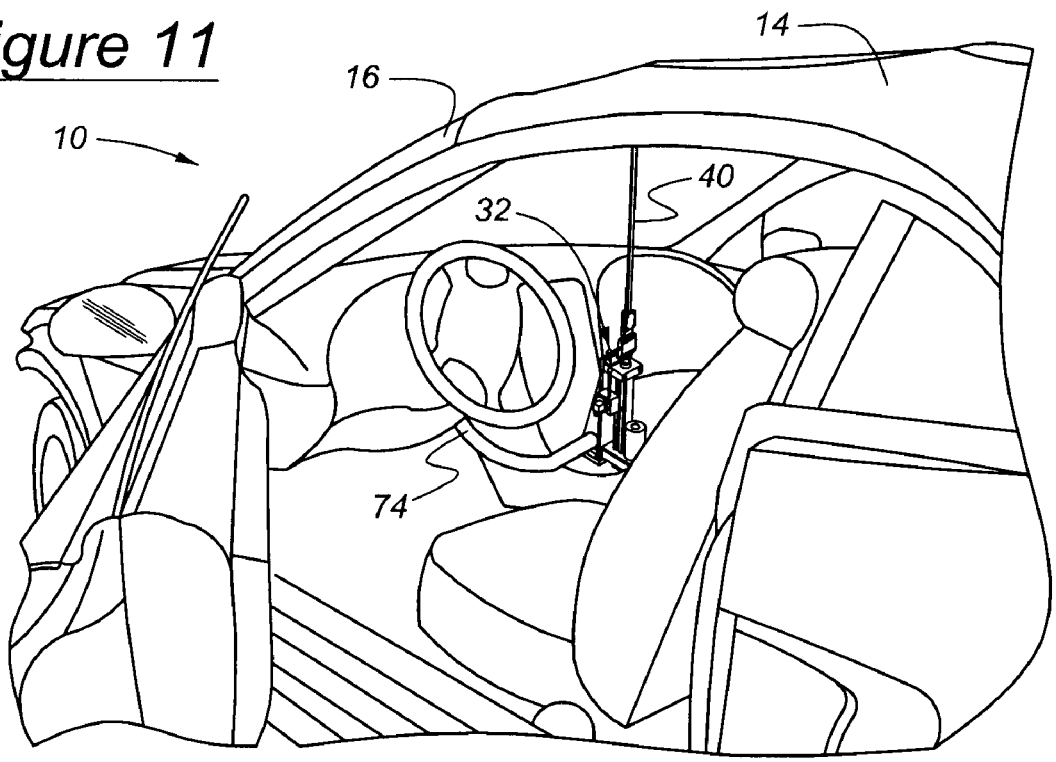
FIG. 11 shows a pulldown actuator according to the present invention installed within a vehicle for the purpose of measuring top pulldown effort in the vehicle.

FIG. 11 illustrates the use of pulldown actuator 32 in a vehicle. This usage includes removable anchor structure 74, which attaches to a vehicle structure such as a dash or seat or some other portion of the vehicle, as desired, to allow pulldown actuator 32 to move top 14 from an open position to a closed position as previously described. The embodiment of FIG. 11 is particularly useful for use in the field by service personnel, so as to assess motorist concerns with the operation of installed convertible tops.

FIG. 12, as mentioned above, shows a plot of force versus travel distance for a convertible top being moved to the fully closed position from an open position such as that shown in FIG. 3. As noted above, the portion of the curve including A through point E is an example of the pin engagement portion of the curve. When the force reaches point D, pins 20 are fully engaged, and pins 20 are driven home in the portion from D to E. Once the curve reaches portion E, the top has been fully seated against windshield header 16 and the operating force rises correspondingly to point F. Those skilled in the art will appreciate in view of this disclosure that the present system and method could be employed to cycle a convertible top through its entire travel from the fully open position to the fully closed position, as well as from the fully closed to the fully open position.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A system for measuring the amount of force required to operate a convertible top for an automotive vehicle, comprising:
   a pulldown actuator for moving a convertible top from an open position into a closed position;
   a position transducer, operatively associated with said pulldown actuator, for measuring the travel of said convertible top;
   a force transducer, operatively associated with said pulldown actuator, for measuring the force exerted by said pulldown actuator upon said top; and
   a controller for recording said measured travel and said force exerted by said pulldown actuator.

2. A system according to claim 1, further comprising a gripper for grasping a portion of said convertible top, with said gripper being attached to said pulldown actuator.

3. A system according to claim 2, wherein said gripper grasps a manual handhold formed in said convertible top.

4. A system according to claim 1, further comprising a fixture upon which said pulldown actuator and a top may be mounted so as to allow the top to be cycled for the purpose of measuring the travel of the top and the force required to move the top from an open position to a closed position.

5. A system according to claim 1, further comprising a removable anchor structure for mounting said pulldown actuator within an automobile for the purpose of measuring the travel and closing force of a convertible top installed upon the vehicle.

6. A method for determining the force required to close a convertible top, comprising the steps of:
   attaching a pulldown actuator to a portion of the top corresponding to a manual gripping location;
   moving the top from an open position to a closed position by means of the pulldown actuator; and
   measuring the travel of the top and the corresponding force exerted by the pulldown actuator upon the top as the top is moved to the closed position.

7. A method according to claim 6, further comprising the step of recording the measured values of top travel and force.

8. A method according to claim 7, further comprising the step of performing a statistical analysis upon the recorded values of top travel and force.

9. A system for determining an operating characteristic of a convertible top for an automotive vehicle, comprising:
- a gripper for grasping a handhold mounted to a convertible top;
- a pulldown actuator for moving a convertible top from an open position into a closed position;
- a flexible, inextensible member having a first end attached to said gripper and a second end attached to said pulldown actuator;
- a position transducer, operatively associated with said pulldown actuator, for measuring the travel of said convertible top;
- a characteristic transducer, operatively associated with said pulldown actuator, for measuring a convertible top operating parameter as the convertible top is moved from one position to another; and
- a controller for operating said pulldown actuator and for recording a plurality of corresponding values of said measured travel and said measured operating parameter.

10. A system according to claim 9, further comprising a removable anchor structure for mounting said pulldown actuator within a vehicle, so as to permit the measurement of top travel and said operating parameter for a top installed upon a vehicle.

11. A system according to claim 9, wherein said controller further comprises a data storage facility for storing a plurality of corresponding values of travel and said operating parameter for a plurality of convertible tops.

12. A system according to claim 9, further comprising a fixture upon which said pulldown actuator and a top may be mounted so as to allow the top to be cycled for the purpose of measuring the both the travel of the top and said operating parameter associated with movement of the top from a first position to a second position.

13. A system according to claim 9, wherein said operating parameter comprises the operating effort required to move the convertible top from an open position to a closed position.

14. A system according to claim 9, wherein said operating parameter comprises the audible noise associated with movement of the convertible top from an open position to a closed position.

* * * * *